United States Patent
Peng et al.

(10) Patent No.: US 10,989,876 B1
(45) Date of Patent: Apr. 27, 2021

(54) OPTICAL FIBER COUPLER HAVING HYBRID TAPERED WAVEGUIDE SEGMENTS AND METAMATERIAL SEGMENTS

(71) Applicant: GLOBALFOUNDRIES U.S. Inc., Santa Clara, CA (US)

(72) Inventors: Bo Peng, Sharon, MA (US); Ajey Poovannummoottil Jacob, Watervliet, NY (US); Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 16/724,507

(22) Filed: Dec. 23, 2019

(51) Int. Cl.
*G02B 6/26* (2006.01)

(52) U.S. Cl.
CPC ........................... *G02B 6/26* (2013.01)

(58) Field of Classification Search
None
See application file for complete search history.

(56) References Cited

U.S. PATENT DOCUMENTS

| | | | |
|---|---|---|---|
| 6,293,688 B1 | 9/2001 | Deacon | |
| 9,274,276 B2 | 3/2016 | Jahani et al. | |
| 9,529,062 B2 | 12/2016 | Iyer et al. | |
| 10,126,500 B2 | 11/2018 | Qi et al. | |
| 10,197,731 B2 | 5/2019 | Teng et al. | |
| 10,816,726 B1* | 10/2020 | Peng | G02B 6/1228 |
| 2015/0180133 A1 | 6/2015 | Hunt et al. | |
| 2017/0017034 A1 | 1/2017 | Painchaud et al. | |
| 2018/0067259 A1* | 3/2018 | Teng | G02B 6/3885 |
| 2018/0120504 A1* | 5/2018 | Qi | G02B 5/1809 |
| 2019/0121126 A1 | 4/2019 | Simmonds | |
| 2020/0003956 A1* | 1/2020 | Kuo | G02B 6/34 |

OTHER PUBLICATIONS

Cheben et al., "Refractive Index Engineering with Subwavelength Gratings for Efficient Microphotonic Couplers and Planar Waveguide Multiplexers," Optics Letters vol. 35, 2010, Issue 15, pp. 2526-2528.

(Continued)

*Primary Examiner* — Tina M Wong
(74) *Attorney, Agent, or Firm* — Gibb & Riley, LLC

(57) ABSTRACT

Optical coupler structures include a waveguide having waveguide metamaterial segments aligned along a first line. A second insulator is on the first insulator and the waveguide metamaterial segments. A coupler structure is in the second insulator and has coupler metamaterial segments aligned along a second line. The first line and the second line are parallel and within a plane. A portion of the waveguide overlaps a portion of the coupler structure. The waveguide metamaterial segments intersect the plane and have first widths perpendicular to the plane, and the first widths have a first taper along the first line. The coupler metamaterial segments intersect the plane and have second widths in the direction perpendicular to the plane. The second widths have a second taper along the second line that is different from the first taper of the first widths where the waveguide overlaps the second coupler structure.

20 Claims, 6 Drawing Sheets

(56) References Cited

OTHER PUBLICATIONS

Cheben et al., "Subwavelength Waveguide Grating for Mode Conversion and Light Coupling in Integrated Optics," Optics Express, vol. 14, No. 11, 2006, pp. 4695-4702.
Teng et al., "Trident Shape SOI Metamaterial Fiber-to-Chip Edge Coupler," Optical Fiber Communications Conference and Exhibition (OFC), 2019, pp. 1-3.
Cheben et al., "Broadband Polarization Independent Nanophotonic Coupler for Silicon Waveguides with Ultra-High Efficiency," Optics Express, vol. 23, No. 17, 2015, pp. 22553-22563.
Papes et al., "Fiber-Chip Edge Coupler with Large Mode Size for Silicon Photonic Wire Waveguides," Optics Express, vol. 24, No. 5, 2016, pp. 5026-5038.
Barwicz et al., "An O-Band Metamaterial Converter Interfacing Standard Optical Fibers to Silicon Nanophotonic Waveguides," Optical Fiber Communication Conference, OSA Technical Digest (online), Optical Society of America, 2015, Paper Th3F.3, pp. 1-3.
Shang et al., "Silicon Nitride Tri-Layer Vertical Y-Junction and 3D Couplers with Arbitrary Splitting Ratio for Photonic Integrated Circuits," Optics Express, vol. 25, No. 9, 2017, pp. 10474-10483.

\* cited by examiner

OPTICAL FIBER COUPLER HAVING HYBRID TAPERED WAVEGUIDE SEGMENTS AND METAMATERIAL SEGMENTS

BACKGROUND

Field of the Invention

The present disclosure relates to optical couplers used with optical fibers and more specifically to optical couplers that use tapered waveguides.

Description of Related Art

Many communication systems utilize light to transmit data in order to increase transmission speed and bandwidth. For purposes herein the term "light" includes all forms of electromagnetic radiation including that within the human-visible wavelengths and outside such wavelengths.

In order to perform light transmission, optical fibers are made of materials that have high internal reflectivity such as glass, plastic, etc. Such optical fibers are often connected to electronic circuitry that can discern the data within the light. Optical couplers are commonly used to physically connect the circuitry with the optical fibers. For example, light waves within waveguides can have many modes including transverse electromagnetic (TEM) modes, transverse electric (TE) modes, transverse magnetic (TM) modes, etc. Some optical fibers can transmit light waves of many modes (multi-mode fibers) while other optical fibers can transmit only a single mode (single-mode fibers).

One issue that sometimes arises relates to the alignment of the optical fibers with the coupler. Some couplers have physical alignment mechanisms (V-grooves, etc.), while others require manual alignment. Indeed, what is desirable is for the entire light transmission system to have very high internal reflection so that all of, or the majority of, the light that is input into the optical fiber reaches the circuitry; with the goal being total internal reflection (TIR) within the components transmitting the light. An optical fiber that is properly aligned with the coupler is more efficient at transmitting the light to the circuitry; and it is, therefore, desirable for the coupler to accommodate some misalignment.

SUMMARY

Coupler structures herein include, among other components a substrate (e.g., silicon), a lower insulator layer (e.g., buried oxide (BOX)) on the substrate and a first insulator (e.g., a shallow trench isolation (STI) material, etc.) on the lower insulator. The lower insulator is between the first insulator and the substrate. A second insulator layer (e.g., undoped silicate glass (USG), etc.) is on the first insulator layer.

This structure also includes first (e.g., lower) and second (e.g., upper) waveguides. The waveguide is in the first insulator layer and the coupler structure is in the second insulator. The waveguide can be formed of any appropriate material, such as silicon, aluminum nitride, etc.; and the coupler structure also can be formed of any appropriate material, such as silicon nitride, aluminum nitride, etc. Also, at least a portion of the waveguide overlaps at least a portion of the coupler structure to allow the light transfer between the waveguides.

The waveguide can at least partially be in segments in the first insulator layer ("waveguide metamaterial segments"). The waveguide metamaterial segments are adjacent to, and separated from, one another and aligned along a single line (a "first line"). The second insulator layer is also on these waveguide metamaterial segments. The coupler structure also can at least partially be in segments in the second insulator layer ("coupler metamaterial segments"). The coupler metamaterial segments are adjacent to, and separated from, one another and also aligned along a single line (a "second line").

The first line and the second line are parallel and within the same plane (e.g., an arbitrary reference plane) meaning that the waveguide and coupler structures lie along the same plane, are parallel to one another. The waveguide metamaterial segments intersect that same plane and have multiple first widths (where the width is in a direction perpendicular to the plane). The coupler metamaterial segments also intersect the same plane and have second widths (again, in the direction perpendicular to the plane).

The first widths of the waveguide metamaterial segments can have a first taper (change in width between adjacent segments) along the first line. Similarly, the second widths can have a second taper along the second line that is different from the first taper of the first widths (at least along where the waveguide overlaps the coupler structure).

Generally, the relationship between the first and second tapers controls the amount of light transfer (energy exchange) between the waveguide and coupler structures by matching mode indices of light within the waveguide and the coupler structure. Specifically, the tapers change the index of refraction. Therefore, the first and second tapers of the first and coupler metamaterial segments can be designed and positioned relative to one another to achieve many different levels of light transfer (coupling efficiency) between the optical fiber and waveguide for many different modes.

For example, the second taper of the second widths along the second line can be opposite (or the reverse of) the first taper of the first widths along the first line. For example, the first widths of the waveguide metamaterial segments may increase where the second widths of the coupler metamaterial segments decrease (e.g., along the overlapping portion of the waveguide and coupler structures) in, for example, a transmission direction that is within the plane and parallel to the first line and the second line.

Alternatively, the waveguide metamaterial segments may lack taper (may all be the same width), while the second widths of the coupler metamaterial segments can have multiple tapers. For example, the second widths of the coupler metamaterial segments increase to a central coupler structure and then decrease from the central coupler structure (when comparing widths along the second line). In other examples, the first widths of the waveguide metamaterial segments can increase to a central waveguide and then decrease from the central waveguide (when comparing widths along the first line). In other options, the second taper may decrease along the second line from the center of the coupler structure to the ends of the coupler structure.

In other structures herein, one or more of the ends of the waveguide can be a continuous, non-segmented structure. In other embodiments, the spacing between the waveguide metamaterial segments decreases as the waveguide metamaterial segments are closer to such a non-segmented structure. Similarly, one or more of the ends of the coupler structure can be a continuous, non-segmented structure. Here, the spacing between the coupler metamaterial segments can also decrease as the coupler metamaterial segments are closer to the non-segmented structure.

Additionally, the substrate has a groove to receive a fiber optic element that is bisected by the aforementioned plane and that is parallel to the first and second lines. The groove has a consistent shape in cross-section such as a V-shape, a U-shape, a rectangular shape, etc.

BRIEF DESCRIPTION OF THE DRAWINGS

The embodiments herein will be better understood from the following detailed description with reference to the drawings, which are not necessarily drawn to scale and in which.

DETAILED DESCRIPTION

Figure 1A:
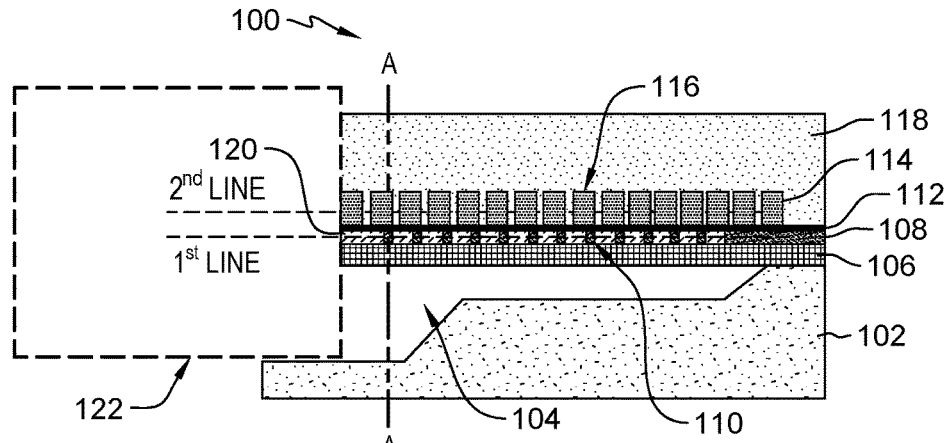
FIGS. 1A, 2A, 3A, 4A, and 5A are cross-sectional schematic diagrams illustrating an optical coupler structure according to embodiments herein.

As mentioned above, an optical fiber that is properly aligned with an optical coupler is more efficient at transmitting light to circuitry; and it is, therefore, desirable for the coupler to accommodate some misalignment of the optical fiber. The systems and methods herein address such issues by utilizing a metamaterial coupler (e.g., by tapering waveguide metamaterial segments in coordination with tapering of adjacent metamaterial segments) so as to compensate for light loss from the waveguide metamaterial segments that may result from misalignment of optical fibers with couplers.

More specifically, with the optical couplers described herein, a groove is positioned on one side (that is arbitrarily refer to as the "bottom") of a waveguide having metamaterial segments, and a metamaterial coupler structure with segments (elements) is positioned on the other side (that is arbitrarily referred to as the "top") of the waveguide, such that the waveguide is between the bottom of the groove and the metamaterial segments of the coupler.

The widths of the waveguide metamaterial segments are tapered between segments that are too small to have acceptable internal reflection and segments that are too large to have acceptable internal reflection. This tapering of the waveguide metamaterial segments helps promote internal reflection within the waveguide and adjusts the mode of the light waves to match that used by the circuitry that will process the light.

The metamaterial segments are also tapered; however, the tapering of the metamaterial segments is adjusted based upon the tapering of the waveguide metamaterial segments so as to tune/control the light transfer function of the metamaterial segments. The tapering of the metamaterial waveguide and the continuous waveguide (based on a non-linear tapering function) minimizes the junction mode mismatch of the waveguide metamaterial segments and the metamaterial segments at different widths. Thus, the tapering amount for SiN, pure Si, and hybrid material utilizations for the metamaterial waveguide and the continuous waveguide can be properly chosen to minimize mode mismatch. That efficiently shortens the total length of the mode converter without introducing additional perturbation to the mode (which otherwise would contribute to the transmission loss and internal reflection).

The SiN/Si metamaterial taper itself engineers the effective core index of the metamaterial to be close to the core index of the cladding of the waveguide so that the modes at the fiber interface expand in dimension to tolerate larger fabrication offset (misalignment and dimensional bias of the components of the coupler) and larger misalignment of the optical fiber with the coupler, without additional loss. The same benefit of compensating for larger fabrication offset and for larger misalignment of the optical fiber applies to the whole tapering region as well, since the mode is expanded during the propagation. Therefore, this benefits robustness towards offset and shorter v-groove for alignment requirements.

Therefore, for example, specific widths and spacings of the waveguide metamaterial segments are highly effective at transferring specific modes of the light. Thus, in the structures herein, the metamaterial segments reduce the effective index of the mode and expand the mode to be less confined within the core of higher refractive index. This reduces the mode sensitivity to the core dimension and offset and increases the mode tolerance to confinement variation. This promotes transmission of the target mode into the waveguide, robustly and efficiently, helping to accommodate larger fabrication offset and larger misalignment of the optical fiber.

Generally, the relationship between the tapers of the waveguide and metamaterial segments controls the amount of light transfer (energy exchange) between the waveguide and coupler structures by matching mode indices and mode overlap of light within the waveguide and the coupler structure. Specifically, the tapers change the index of refraction of the waveguides. Therefore, the first and second tapers of the first and coupler metamaterial segments can be designed and positioned relative to one another to achieve many different levels of light transfer (coupling efficiency) between the optical fiber and waveguide for many different modes.

For example, the second taper of the second widths along the second line can be the opposite or the reverse of the first taper of the first widths along the first line. Thus, the first widths of the waveguide metamaterial segments may increase where the second widths of the coupler metamaterial segments decrease (e.g., along the overlapping portion of the waveguide and coupler structures) in, for example, a transmission direction that is within the plane and parallel to the first line and the second line.

Alternatively, the waveguide metamaterial segments may lack taper (may all be the same width), while the second widths of the coupler metamaterial segments can have multiple tapers. For example, the second widths of the coupler metamaterial segments increase to a central coupler structure and then decrease from the central coupler structure (when comparing widths along the second line). In other examples, the first widths of the waveguide metamaterial segments can increase to a central waveguide and then decrease from the central waveguide (when comparing widths along the first line). In other options, the second taper may decrease along the second line from the center of the coupler structure to the ends of the coupler structure.

In other structures herein, one or more of the ends of the waveguide can be a continuous, non-segmented structure. In other embodiments, the spacing between the waveguide metamaterial segments decreases as the waveguide metamaterial segments are closer to such a non-segmented structure. Similarly, one or more of the ends of the coupler structure can be a continuous, non-segmented structure. Here, the spacing between the coupler metamaterial segments can also decrease as the coupler metamaterial segments are closer to the non-segmented structure.

A metamaterial is a material having a refractive index of value which is substantially equal to or less than about 1.0. Specifically, a metamaterial is a material that gains its property from the structure of the material rather than directly from its composition. Metamaterial may be distinguished from composite materials based on the properties that may be present in metamaterial. As noted below, the metamaterial herein can be formed of silicon nitride, aluminum nitride, etc. A reduction in the critical internal angle for TIR of light within the waveguide is achieved by placing the metamaterial adjacent the waveguide. With the adjacent metamaterial, more light can be retained by TIR within the waveguide and directed/guided along the waveguide.

Figure 1B:
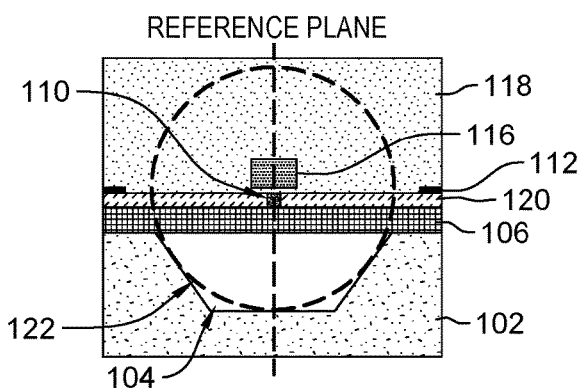
FIGS. 1B, 2B, 3B, 4B, and 5B are cross-sectional schematic diagrams illustrating an optical coupler structure according to embodiments herein along line A-A shown in FIGS. 1A, 2A, 3A, 4A, and 5A.

Referring now to the drawings, FIG. 1A is a cross-sectional schematic diagram illustrating an optical coupler structure 100 according to embodiments herein, FIG. 1B is also a cross-sectional schematic diagrams illustrating the same optical coupler structure 100 along line A-A shown in FIG. 1A, FIGS. 1C-1E are top-view schematic diagrams illustrating waveguide 110 and metamaterial 116 structures according to embodiments herein along the reference plane shown in FIG. 1B. Also, FIG. 1A is a cross-section along the plane shown in FIG. 1B.

FIGS. 1A-1B show that optical coupler structures 100 herein include, among other components a substrate 102 (e.g., silicon), a lower insulator layer 106 (e.g., buried oxide (BOX)) on the substrate 100 and a first insulator 120 (e.g., a shallow trench isolation (STI) material, etc.) on the lower insulator 106. The substrate 102 is patterned to include groove 104 in which an optical fiber 122 can be positioned. The lower insulator 106 is between the first insulator 120 and the substrate 102. A first insulator layer 120 (e.g., undoped silicate glass (USG), etc.) is on the lower insulator layer 106. A separator layer 112 is on the first insulator layer 120.

Figure 1C:
FIGS. 1C, 2C, 3C, 4C, and 5C are top-view schematic diagrams illustrating overlapping waveguide and coupler structures according to embodiments herein along the reference plane shown in FIGS. 1B, 2B, 3B, 4B, and 5B.
Figure 1D:
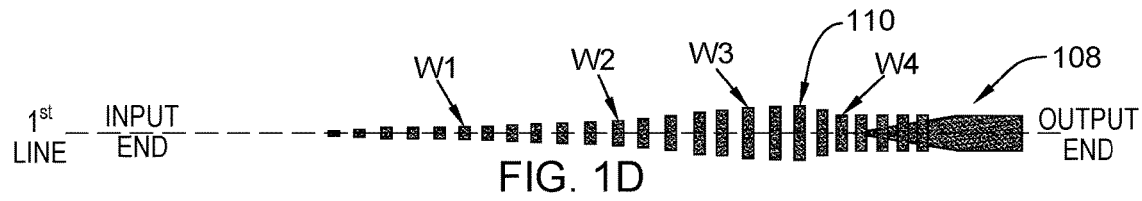
FIGS. 1D, 2D, 3D, 4D, and 5D are top-view schematic diagrams illustrating only the waveguide shown in FIGS. 1C, 2C, 3C, 4C, and 5C.
Figure 1E:
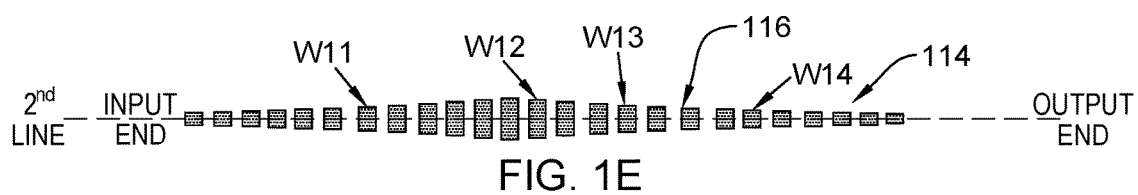
FIGS. 1E, 2E, 3E, 4E, and 5E are top-view schematic diagrams illustrating only the coupler structure shown in FIGS. 1C, 2C, 3C, 4C, and 5C.

This structure also includes a waveguide 108 and a coupler structure 114 and such are illustrated more clearly in isolated views shown in FIGS. 1C-1E. FIGS. 1A-1B show that the waveguide 108 is in the first insulator layer 120 and the coupler structure 114 is in a third insulator 118. The waveguide 108 can be formed of any appropriate material, such as silicon, aluminum nitride, etc.; and the coupler structure 114 also can be formed of any appropriate material, such as silicon nitride, aluminum nitride, etc. Also, as shown in FIGS. 1A and 1C, at least a portion of the waveguide 108 overlaps at least a portion of the coupler structure 114.

FIGS. 1A-1C show that the waveguide 108 can at least partially be in segments 110 in the first insulator layer 120 ("waveguide metamaterial segments"). FIGS. 1C-1D show that the waveguide metamaterial segments 110 are adjacent to, and separated from, one another and aligned along a single line (a "first line"). The first insulator layer 120 is also on these waveguide metamaterial segments 110. FIGS. 1A-1C show that the coupler structure 114 also can at least partially be in segments in the first insulator layer 120 ("metamaterial segments 116"). FIGS. 1C and 1E show that the metamaterial segments 116 are adjacent to, and separated from, one another and also aligned along a single line (a "second line").

The first and second lines are parallel and within the same plane (e.g., an arbitrary reference plane shown vertically in FIG. 1B) meaning that the waveguide 108 and coupler structure 114 lie along the same plane (vertical plane in the drawings) and are parallel to one another. The waveguide metamaterial segments 110 intersect that same plane and have multiple first widths W1-W4 (where these widths W1-W4 are in a direction perpendicular to the plane). The metamaterial segments 116 also intersect that same vertical plane and have second widths W11-W14 (again, in the direction perpendicular to the plane).

The first widths W1-W4 of the waveguide metamaterial segments 110 can have a first taper (where "taper" results from a continuous change in width between adjacent segments) along the first line. Therefore, W2 is wider than W1, and W3 is wider that W2 because the widths are (taper is) increasing in that portion of the waveguide metamaterial segments 110, but W3 is wider than W4 because the widths are decreasing in that portion of the waveguide metamaterial segments 110. Similarly, the second widths W11-W14 can have a second taper along the second line that is different from the first taper of the first widths W1-W4 (at least along where the waveguide 108 overlaps the coupler structure 114). Therefore, W12 is wider than W11 because the widths (taper) are increasing in that portion of the metamaterial segments 116, but W12 is wider than W13, and W13 is wider than W14 because the widths are decreasing in that portion of the metamaterial segments 116.

Generally, the relationship between the first and second tapers controls the amount of light transfer (energy exchange) between the waveguide 108 and coupler structure 114 by matching mode indices of light within the waveguide 108 and the coupler structure 114. Specifically, the tapers change the index of refraction of the waveguide 108. Here, the initial increasing taper (from input to output) of the coupler structure 114 allows the coupler structure 114 to initially acquire more light energy of one mode. The subsequent decreasing taper of the coupler structure 114 in combination with the increasing taper of the waveguide 108 causes light energy to evanesce (escape) from the coupler structure 114 and be received into the waveguide 108. Therefore, the relationship between the first and second tapers of the waveguide metamaterial segments 110 and the coupler metamaterial segments 116 can be designed and positioned relative to one another to achieve many different levels of light transfer (coupling efficiency) between the optical fiber 122 and the waveguide 108 for many different modes. In other words, the amount (degree or abruptness) of taper of the waveguide 108 and/or the coupler structure 114 (or whether taper is even present in one or both structures), the length of overlapping portions of the waveguide 108 and the coupler structure 114 that are tapered, the thickness of the third insulator 118 between the waveguide 108 to the coupler structure 114, etc., can all be adjusted. This allows the relationship between the spacing and taper of the metamaterial portions of the waveguide 108 and the coupler structure 114 to accommodate specific coupler structure requirements and balance coupler efficiencies against accommodations for misalignment and manufacturing variations.

In structures herein, the first widths W1-W4 of the waveguide metamaterial segments 110 can increase to a central waveguide and then decrease from the central waveguide (when comparing widths along the first line). Similarly, the second widths W11-W14 of the metamaterial segments 116 can increase to a central coupler structure and then decrease from the central coupler structure (when comparing widths W11-W14 along the second line). In other options, the second taper may decrease along the second line from the center of the coupler structure 114 to the ends of the coupler structure 114.

In other examples, the second taper of the second widths W11-W14 along the second line can be the opposite or the reverse of the first taper of the first widths W1-W4 along the first line. Thus, the first widths W1-W4 of the waveguide metamaterial segments 110 may increase where the second widths W11-W14 of the metamaterial segments 116 decrease (e.g., along the overlapping portion of the waveguide 116 and coupler structures 114) in, for example, a transmission direction. This transmission direction is within the plane and parallel to the first line and the second line.

FIG. 1C illustrates that the vertical reference plane discussed above can be considered to have an "input" end that is adjacent the optical fiber 122; and an "output" end that is opposite the input end. FIG. 1D illustrates that the (same, but separately illustrated) waveguide 108 similarly has ends, one of which is referred to herein as a "input" end that is relatively closer to the input end of the plane; and an "output" end that is relatively closer to the output end of the plane. FIG. 1E illustrates that the (same, but separately illustrated) coupler structure 114 also has ends, one of which is referred to as an "input" end relatively closer to the input end of the plane; and an "output" end that is relatively closer to the output end of the plane.

Given such nomenclature, because the waveguide 108 and the coupler structure 114 may only partially overlap, the input end of the coupler structure 114 may be closer to the input end of the plane than the input end of the waveguide 108 is to the input end of the plane. Corresponding, the output end of the waveguide 108 may be closer to the output end of the plane than the output end of the coupler structure 114 is to the output end of the plane. Thus, the waveguide 108 may only overlap the coupler structure 114 from the input end of the waveguide 108 to the output end of the coupler structure 114.

Many different manufacturing processes could be utilized to form of structure shown in FIGS. 1A-1E. For example, a silicon-on-insulator (SOI) wafer could be supplied or manufactured to supply the substrate 102 and lower insulator layer 106. A material layer (e.g. silicon, aluminum nitride) could be deposited on the lower insulators layer 106 and then patterned to form the waveguide 108. The first insulator layer 120 could then be formed (deposited, grown, etc.) on the waveguide 108, and the separator player 112 could similarly be deposited and pattern on the first insulator layer 120. Following this, a layer of additional material (e.g., silicon nitride, aluminum nitride) can be deposited on the first insulator layer 120 and then patterned into the coupler structure 114. The second insulator layer 118 can be formed, followed by various back-end-of-line (BEOL) containing wiring connections for the various circuit elements. The BEOL structures can be removed and replaced with an insulator (e.g., thermal oxidization of silicon (TEOS)), recesses can be formed down to the substrate 102, and an undercut can be performed to create the groove 104.

Figure 2A:
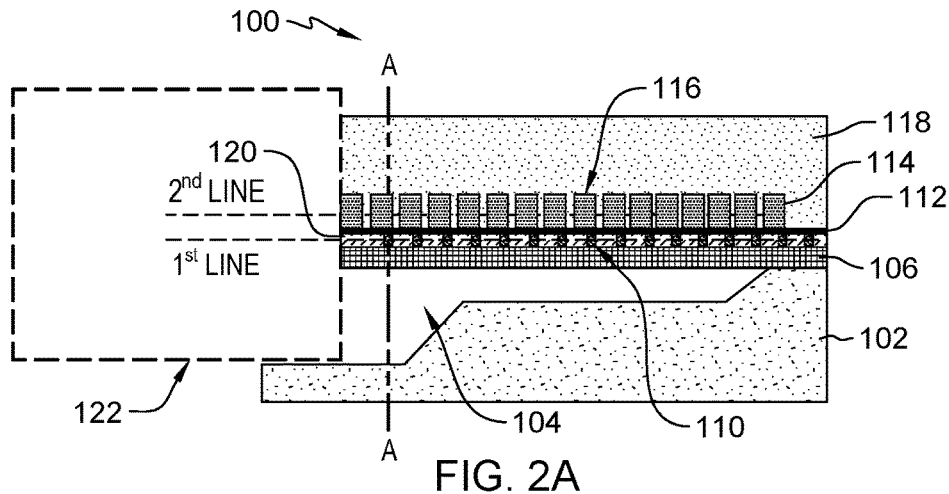
Figure 2B:
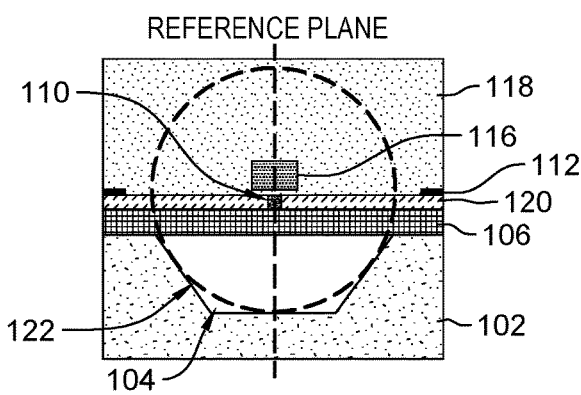
Figure 2C:
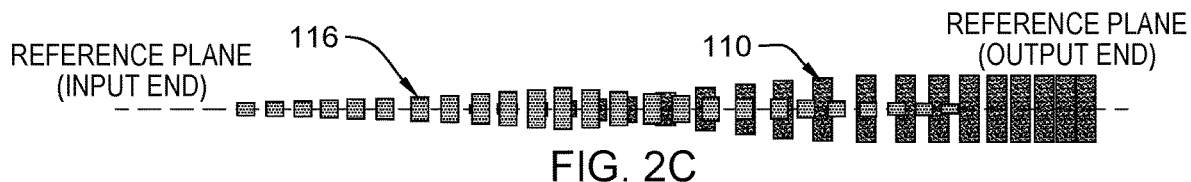
Figure 2D:
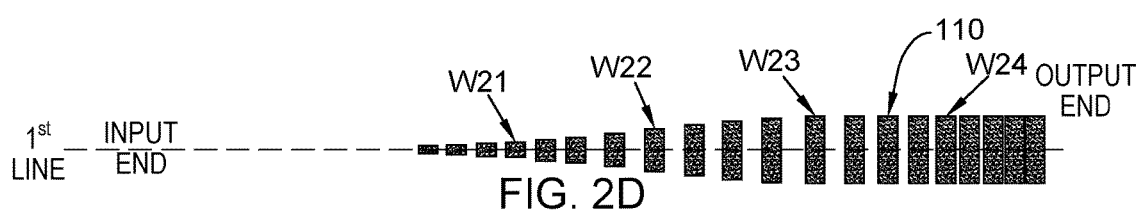
Figure 2E:
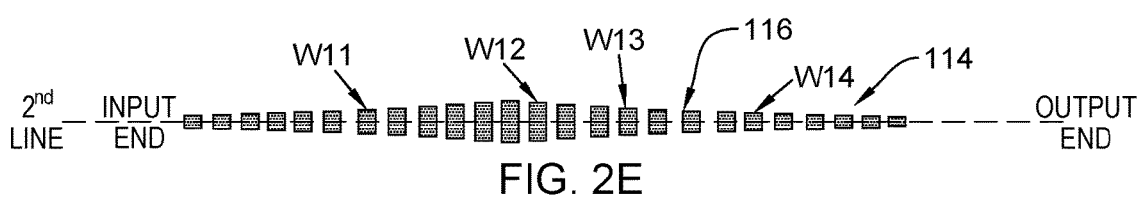

FIGS. 2A-2E show alternative optical couplers using the same viewing angles as shown in FIGS. 1A-1E, where the same elements are identified using the same numbers and a redundant discussion of the same is avoided for brevity. FIGS. 2A-2E show that alternatively all or a portion of the waveguide metamaterial segments 110 may lack taper (may all be the same width W23-W24), while the second widths W11-W14 of the metamaterial segments 116 can have multiple tapers. Thus, while W22 is wider than W21 and W23 is wider than W22, from that point on W23 is the same width to the output end of the first line. In this example, using a more abrupt and only increasing width taper for the waveguide metamaterial segments 110, as is shown in FIGS. 2A-2E, helps the waveguide 108 maintain more of any received light energy relative to the increasing and decreasing taper waveguide metamaterial segments 110 shown in FIGS. 1A-1E (at the expense of possible mode distinction). In some embodiments, the spacing between the waveguide metamaterial segments 110 can decrease as the waveguide metamaterial segments 110 are closer to the output end of the first line, as illustrated in FIGS. 2C-2D.

Figure 3A:
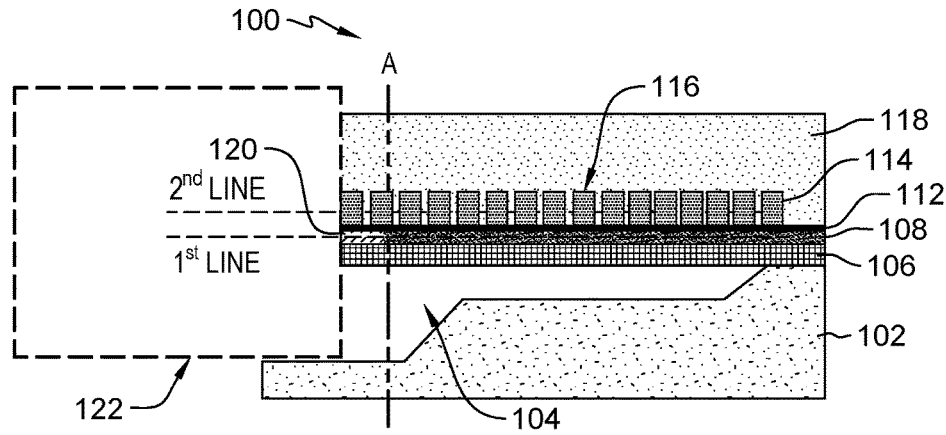
Figure 3B:
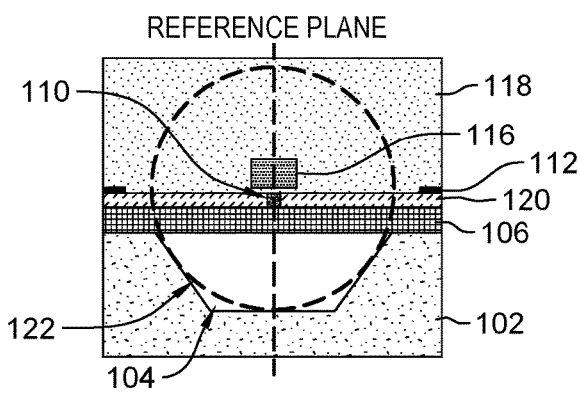
Figure 3C:
Figure 3D:
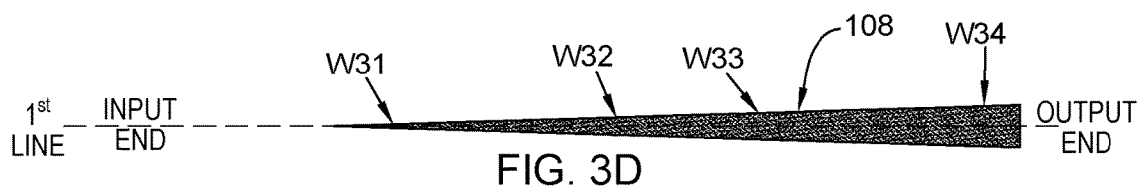
Figure 3E:
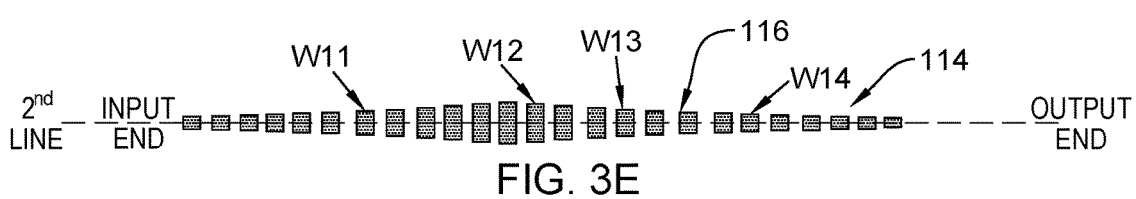
Figure 4A:
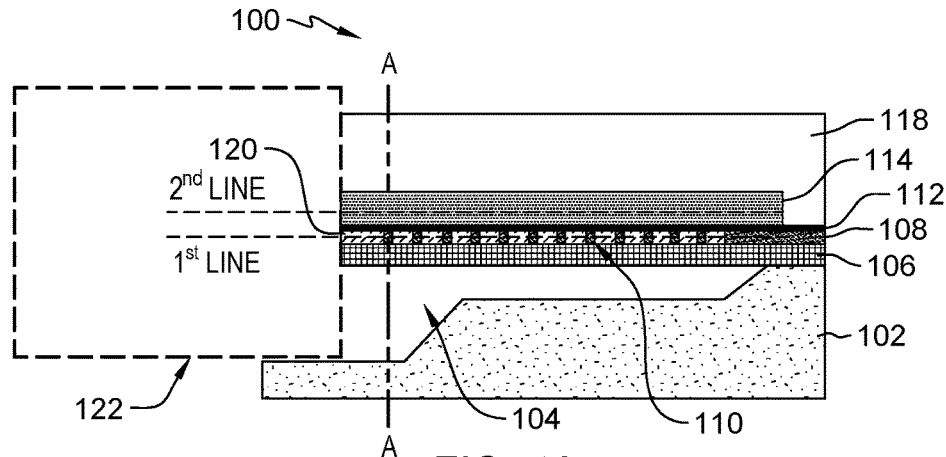
Figure 4B:
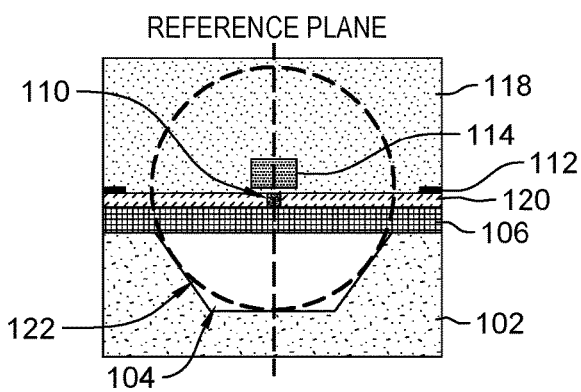
Figure 4C:
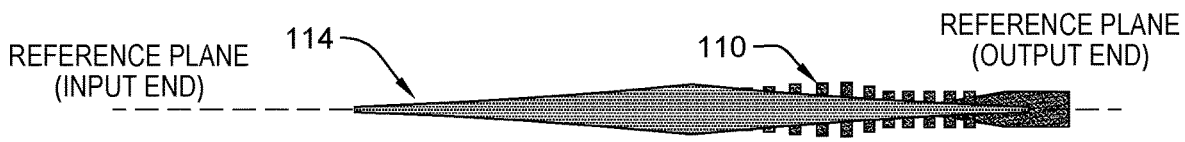
Figure 4D:
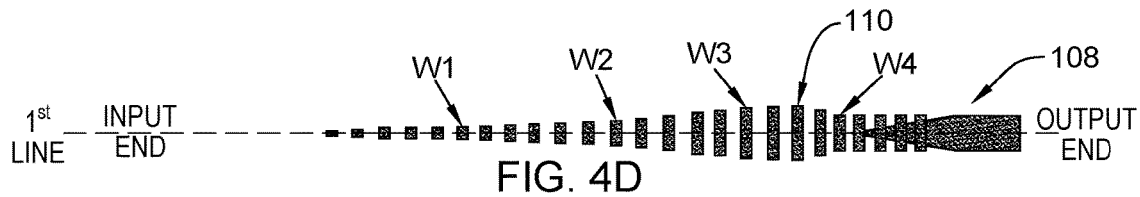
Figure 4E:
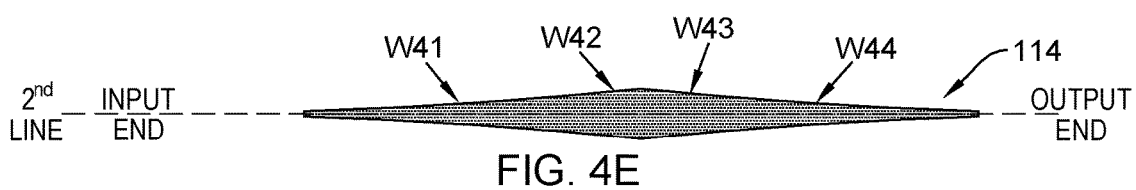
Figure 5A:
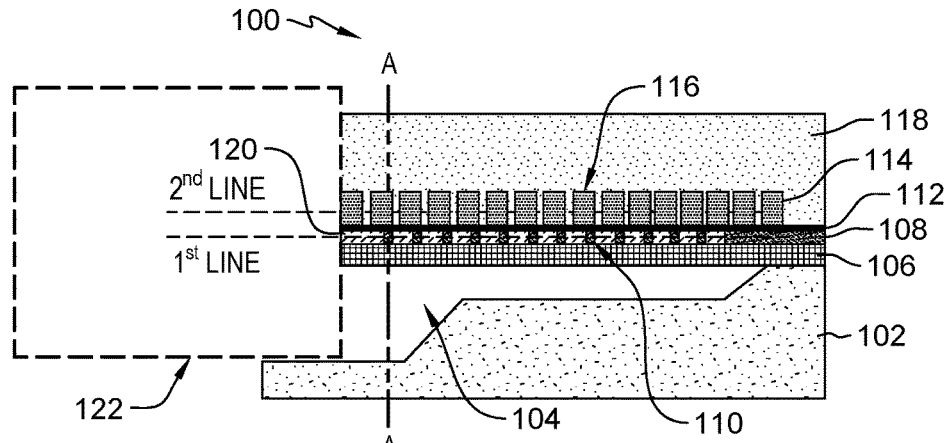
Figure 5B:
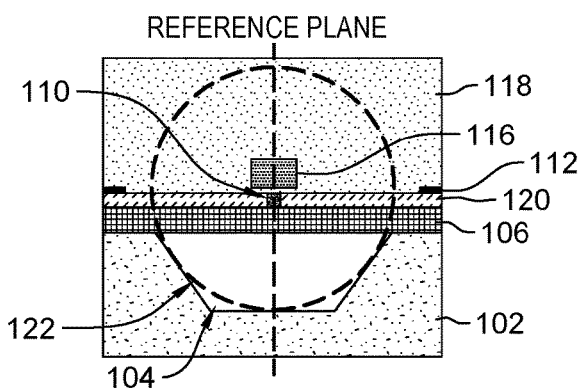
Figure 5C:
Figure 5D:
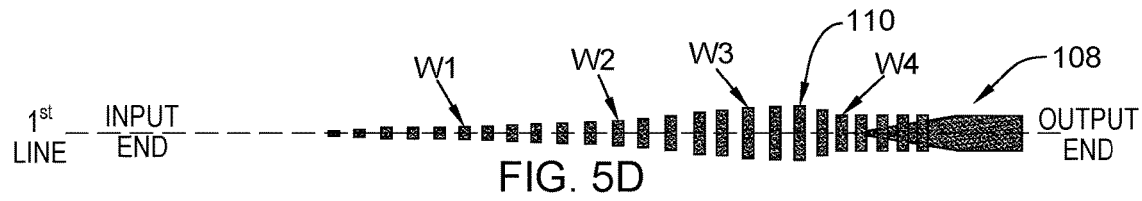
Figure 5E:
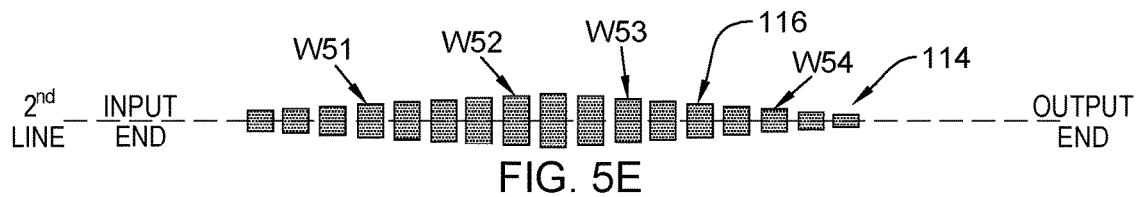

FIGS. 3A-3E show alternative optical couplers using the same viewing angles as shown in FIGS. 1A-1E, where the same elements are identified using the same numbers and a redundant discussion of the same is avoided for brevity. In the structures shown in FIGS. 1A-1E, one or more of the ends of the waveguide 108 can be a continuous, non-segmented structure. In contrast, in the structures shown in FIGS. 3A-3E, all of the waveguide 108 can be a continuous, non-segmented structure. In this example, avoiding waveguide metamaterial segments 110, as is shown in FIGS. 3A-3E, also can promote the waveguide 108 maintaining more of any received light energy relative to the increasing and decreasing taper waveguide metamaterial segments 110 shown in FIGS. 1A-1E (at the expense of possible mode distinction). Therefore, as shown in FIGS. 3C-3D, the waveguide 108 can be a continuous, non-segmented structure with constantly increasing widths W31-W34.

FIGS. 4A-4E show alternative optical couplers using the same viewing angles as shown in FIGS. 1A-1E, where the same elements are identified using the same numbers and a redundant discussion of the same is avoided for brevity. In the structures shown in FIGS. 4A-4E, all of the coupler structure 114 can be a continuous, non-segmented structure. Here, the widths W41, W42 increase from the input end to the midpoint of the coupler structure 114 and then decrease W43, W44 when progressing from the midpoint to the output end. In this example, using a non-segmented coupler structure 114, as is shown in FIGS. 4A-4E, helps the coupler structure acquire more light energy relative to the metamaterial segments 116 shown in FIGS. 1A-1E (at the expense of possible mode distinction).

FIGS. 5A-5E show alternative optical couplers using the same viewing angles as shown in FIGS. 3A-3E, where the same elements are identified using the same numbers and a redundant discussion of the same is avoided for brevity. While FIGS. 3A-3E show the coupler structure 114 having non-linear tapers, in the structures shown in FIGS. 5A-5E, the coupler structure 114 has increasing and decreasing linear tapers and larger segments (e.g., that are longer in the transmission direction from input end to output end along the vertical reference plane). Therefore, the increasing widths (e.g., W51 and W52) progress in equal width increments between adjacent metamaterial segments 116; and similarly the decreasing widths (e.g., W53 and W54) progress in equal width increments between adjacent metamaterial segments 116. In this example, making coupler metamaterial segments 116 larger and/or more regularly progressing in width, as is shown in FIGS. 5A-5E, also can promote the coupler structure acquiring more light energy relative to the smaller, more progressively tapered metamaterial segments 116 shown in FIGS. 1A-1E (at the expense of possible mode distinction).

Figure 6A:
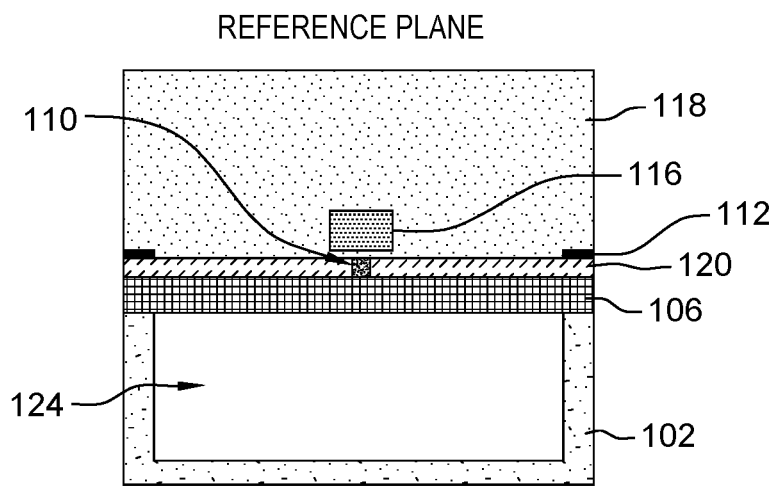
FIGS. 6A and 6B are cross-sectional schematic diagrams illustrating an optical coupler structure according to embodiments herein along line A-A shown in FIGS. 1A, 2A, 3A, 4A, and 5A.
Figure 6B:
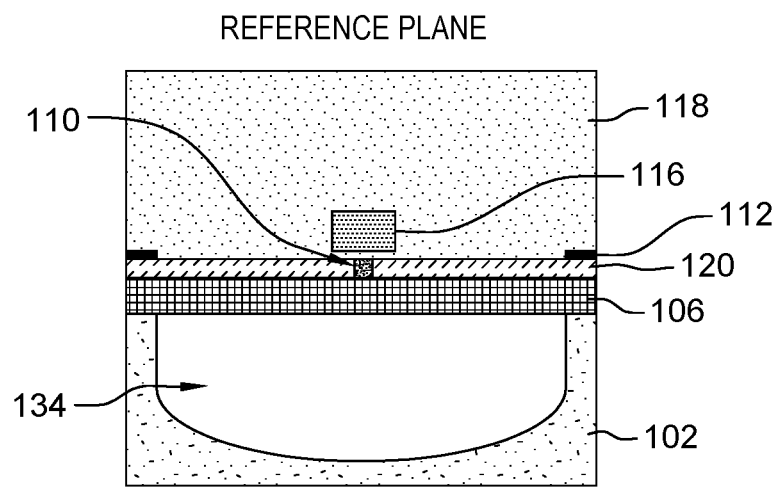

FIGS. 1B, 2B, 3B, 4B, and 5B show that the groove 104 can have a V-shape. In contrast, FIG. 6A shows that the groove 124 can have a rectangular shape, and FIG. 6B shows that the groove 134 can have a U-shape. These different groove shapes can help with proper physical placement and alignment of the optical fiber 122.

Figure 7:
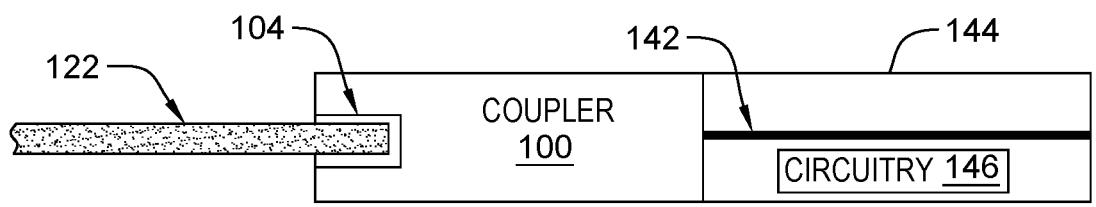
FIG. 7 is a schematic diagram illustrating an optical coupler structure and circuitry according to embodiments herein.

FIG. 7 is a schematic diagram illustrating such an optical coupler structure 100 and circuitry 146. The optical fiber 122 is shown in the groove 104 in FIG. 7. Additionally, the coupler structure 100 transmits the light from the optical fiber 122 into a waveguide 142 that transfers the light to the light-processing circuitry 146 that is on the integrated circuit device 144.

As used herein, "implantation processes" can take any appropriate form (whether now known or developed in the future) and can be, for example, ion implantation, etc. Epitaxial growth occurs in a heated (and sometimes pressurized) environment that is rich with a gas of the material that is to be grown.

When patterning any material herein, the material to be patterned can be grown or deposited in any known manner and a patterning layer (such as an organic photoresist) can be formed over the material. The patterning layer (resist) can be exposed to some pattern of light radiation (e.g., patterned exposure, laser exposure, etc.) provided in a light exposure pattern, and then the resist is developed using a chemical agent. This process changes the physical characteristics of the portion of the resist that was exposed to the light. Then one portion of the resist can be rinsed off, leaving the other portion of the resist to protect the material to be patterned (which portion of the resist that is rinsed off depends upon whether the resist is a negative resist (illuminated portions remain) or positive resist (illuminated portions are rinsed off). A material removal process is then performed (e.g., wet etching, anisotropic etching (orientation dependent etching), plasma etching (reactive ion etching (RIE), etc.)) to remove the unprotected portions of the material below the resist to be patterned. The resist is subsequently removed to leave the underlying material patterned according to the light exposure pattern (or a negative image thereof).

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are

What is claimed is:

1. An optical coupler structure comprising:
a waveguide in a first insulator and comprising waveguide metamaterial segments separated from one another and aligned along a first line;
a second insulator on the first insulator and the waveguide metamaterial segments; and
a coupler structure in the second insulator and comprising coupler metamaterial segments separated from one another and aligned along a second line,
wherein the first line and the second line are parallel and within a plane,
wherein a portion of the waveguide overlaps a portion of the coupler structure,
wherein the waveguide metamaterial segments intersect the plane and have first widths in a direction perpendicular to the plane, and the first widths have a first taper along the first line, and
wherein the coupler metamaterial segments intersect the plane and have second widths in the direction perpendicular to the plane, and the second widths have a second taper along the second line that is different from the first taper of the first widths.

2. The optical coupler structure according to claim 1, wherein along an overlapping portion of the waveguide and the coupler structure in a transmission direction within the plane and parallel to the first line and the second line, the first widths of the waveguide metamaterial segments increase and the second widths of the coupler metamaterial segments decrease.

3. The optical coupler structure according to claim 1, wherein along the first line the first widths of the waveguide metamaterial segments increase to a central waveguide and decrease from the central waveguide, and wherein along the second line the second widths of the coupler metamaterial segments increase to a central coupler structure and decrease from the central coupler structure.

4. The optical coupler structure according to claim 1, further comprising:
a lower insulator layer contacting the first insulator; and
a substrate contacting the lower insulator layer,
wherein the lower insulator layer is between the first insulator and the substrate,
wherein the substrate has a groove bisected by the plane and parallel to the first line and the second line, and
wherein the groove has a shape in cross-section comprising one of: a V-shape, a U-shape, and a rectangular shape.

5. The optical coupler structure according to claim 1, wherein an end of the waveguide comprises a continuous, non-segmented structure,
wherein spacing between the waveguide metamaterial segments decreases as the waveguide metamaterial segments are closer to the non-segmented structure,
wherein an end of the coupler structure comprises a continuous, non-segmented structure, and
wherein spacing between the coupler metamaterial segments decreases as the coupler metamaterial segments are closer to the non-segmented structure.

6. The optical coupler structure according to claim 1, wherein the plane has an input end and an output end opposite one another,
wherein the waveguide has an input end relatively closer to the input end of the plane and an output end relatively closer to the output end of the plane,
wherein the coupler structure has an input end relatively closer to an input end of the plane and an output end relatively closer to the output end of the plane,
wherein the input end of the coupler structure is closer to the input end of the plane than the input end of the waveguide is to the input end of the plane,
wherein the output end of the waveguide is closer to the output end of the plane than the output end of the coupler structure is to the output end of the plane, and
wherein the waveguide overlaps the coupler structure from the input end of the waveguide to the output end of the coupler structure.

7. The optical coupler structure according to claim 1, wherein the waveguide comprises one of silicon and aluminum nitride, and wherein the coupler structure comprises one of silicon nitride and aluminum nitride.

8. An optical coupler structure comprising:
a waveguide in a first insulator and comprising waveguide metamaterial segments separated from one another and aligned along a first line;
a second insulator on the first insulator and the waveguide metamaterial segments; and
a coupler structure in the second insulator and comprising coupler metamaterial segments separated from one another and aligned along a second line,
wherein the first line and the second line are parallel and within a plane,
wherein a portion of the waveguide overlaps a portion of the coupler structure,
wherein the waveguide metamaterial segments intersect the plane and have first widths in a direction perpendicular to the plane, and the first widths have a first taper along the first line,
wherein the coupler metamaterial segments intersect the plane and have second widths in the direction perpendicular to the plane, and the second widths have a second taper along the second line that is different from the first taper of the first widths where the waveguide overlaps the coupler structure, and
wherein a relationship between the first taper and the second taper controls energy exchange between the waveguide and the coupler structure.

9. The optical coupler structure according to claim 8, wherein along an overlapping portion of the waveguide and the coupler structure in a transmission direction within the plane and parallel to the first line and the second line, the first widths of the waveguide metamaterial segments increase and the second widths of the coupler metamaterial segments decrease.

10. The optical coupler structure according to claim 8, wherein along the first line the first widths of the waveguide metamaterial segments increase to a central waveguide and decrease from the central waveguide, and wherein along the second line the second widths of the coupler metamaterial segments increase to a central coupler structure and decrease from the central coupler structure.

11. The optical coupler structure according to claim 8, further comprising:
- a lower insulator layer contacting the first insulator; and
- a substrate contacting the lower insulator layer,
- wherein the lower insulator layer is between the first insulator and the substrate,
- wherein the substrate has a groove bisected by the plane and parallel to the first line and the second line, and
- wherein the groove has a shape in cross-section comprising one of: a V-shape, a U-shape, and a rectangular shape.

12. The optical coupler structure according to claim 8, wherein an end of the waveguide comprises a continuous, non-segmented structure,
- wherein spacing between the waveguide metamaterial segments decreases as the waveguide metamaterial segments are closer to the non-segmented structure,
- wherein an end of the coupler structure comprises a continuous, non-segmented structure, and
- wherein spacing between the coupler metamaterial segments decreases as the coupler metamaterial segments are closer to the non-segmented structure.

13. The optical coupler structure according to claim 8, wherein the plane has an input end and an output end opposite one another,
- wherein the waveguide has an input end relatively closer to the input end of the plane and an output end relatively closer to the output end of the plane,
- wherein the coupler structure has an input end relatively closer to an input end of the plane and an output end relatively closer to the output end of the plane,
- wherein the input end of the coupler structure is closer to the input end of the plane than the input end of the waveguide is to the input end of the plane,
- wherein the output end of the waveguide is closer to the output end of the plane than the output end of the coupler structure is to the output end of the plane, and
- wherein the waveguide overlaps the coupler structure from the input end of the waveguide to the output end of the coupler structure.

14. The optical coupler structure according to claim 1, wherein along an overlapping portion of the waveguide and the coupler structure in a transmission direction within the plane and parallel to the first line and the second line, a portion of the first taper is opposite the second taper.

15. The optical coupler structure according to claim 1, wherein along an overlapping portion of the waveguide and the coupler structure in a transmission direction within the plane and parallel to the first line and the second line, a relatively widest one of the waveguide metamaterial segments is not aligned with a relatively widest one of the coupler metamaterial segments.

16. The optical coupler structure according to claim 1, wherein along an overlapping portion of the waveguide and the coupler structure in a transmission direction within the plane and parallel to the first line and the second line the waveguide metamaterial segments only increase in width and the coupler metamaterial segments increase and decrease in width.

17. The optical coupler structure according to claim 8, wherein along an overlapping portion of the waveguide and the coupler structure in a transmission direction within the plane and parallel to the first line and the second line, a portion of the first taper is opposite the second taper.

18. The optical coupler structure according to claim 8, wherein along an overlapping portion of the waveguide and the coupler structure in a transmission direction within the plane and parallel to the first line and the second line, a relatively widest one of the waveguide metamaterial segments is not aligned with a relatively widest one of the coupler metamaterial segments.

19. The optical coupler structure according to claim 8, wherein along an overlapping portion of the waveguide and the coupler structure in a transmission direction within the plane and parallel to the first line and the second line the waveguide metamaterial segments only increase in width and the coupler metamaterial segments increase and decrease in width.

20. The optical coupler structure according to claim 8, wherein the waveguide comprises one of silicon and aluminum nitride, and wherein the coupler structure comprises one of silicon nitride and aluminum nitride.

* * * * *